(12) United States Patent
Hiscock

(10) Patent No.: US 8,718,117 B2
(45) Date of Patent: May 6, 2014

(54) CHIRP COMMUNICATIONS

(75) Inventor: Paul Dominic Hiscock, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 0 days.

(21) Appl. No.: 13/451,493

(22) Filed: Apr. 19, 2012

(65) Prior Publication Data

US 2012/0269232 A1 Oct. 25, 2012

(30) Foreign Application Priority Data

Apr. 19, 2011 (GB) .................................. 1106609.9
May 6, 2011 (GB) .................................. 1107562.9

(51) Int. Cl.
*H04B 1/00* (2006.01)
(52) U.S. Cl.
USPC ........... 375/139; 375/130; 375/132; 375/133; 375/260
(58) Field of Classification Search
USPC ......... 375/130–136, 139–142, 146–147, 150, 375/256–258, 259–260, 271–272, 295, 303, 375/309, 316, 322, 334
See application file for complete search history.

(56) References Cited

U.S. PATENT DOCUMENTS

| | | | | | |
|---|---|---|---|---|---|
| 5,359,625 | A | * | 10/1994 | Vander Mey et al. | 375/142 |
| 5,452,291 | A | * | 9/1995 | Eisenhandler et al. | 370/402 |
| 5,668,880 | A | * | 9/1997 | Alajajian | 370/342 |
| 5,748,670 | A | * | 5/1998 | Zastrow | 375/139 |
| 5,850,390 | A | * | 12/1998 | Ramel | 370/330 |
| 6,064,695 | A | * | 5/2000 | Raphaeli | 375/230 |
| 6,335,946 | B1 | * | 1/2002 | Winnberg | 375/132 |
| 6,418,158 | B1 | * | 7/2002 | Vishwanath et al. | 375/139 |
| 6,549,562 | B1 | * | 4/2003 | Olaker et al. | 375/139 |
| 8,031,650 | B2 | * | 10/2011 | Petite et al. | 370/320 |
| 8,175,134 | B1 | * | 5/2012 | Giallorenzi et al. | 375/140 |
| 8,180,881 | B2 | * | 5/2012 | Seo et al. | 709/224 |
| 8,406,275 | B2 | * | 3/2013 | Sforza | 375/139 |
| 8,548,025 | B2 | * | 10/2013 | Bettendorff et al. | 375/133 |
| 2001/0055352 | A1 | | 12/2001 | Bannasch et al. | |
| 2002/0009125 | A1 | * | 1/2002 | Shi | 375/139 |
| 2004/0160988 | A1 | * | 8/2004 | Boehlke et al. | 370/480 |
| 2008/0137717 | A1 | * | 6/2008 | Lee | 375/139 |
| 2008/0267137 | A1 | * | 10/2008 | Dabak et al. | 370/336 |
| 2009/0116839 | A1 | * | 5/2009 | Kikuchi et al. | 398/79 |
| 2010/0054348 | A1 | * | 3/2010 | Choi et al. | 375/259 |
| 2010/0150209 | A1 | * | 6/2010 | Gonzalez et al. | 375/139 |
| 2011/0280332 | A1 | * | 11/2011 | Yonge, III | 375/288 |
| 2011/0310765 | A1 | * | 12/2011 | Hui et al. | 370/252 |

* cited by examiner

*Primary Examiner* — Sam K Ahn
*Assistant Examiner* — James M Perez
(74) *Attorney, Agent, or Firm* — Pillsbury Winthrop Shaw Pittman LLP

(57) ABSTRACT

A transmitter configured to communicate a data chirp signal to a receiver, the chirp signal comprising at least one symbol, each symbol comprising one or more identical chirps, each symbol having a different gradient to another symbol in the chirp signal, each chirp encoding a symbol value, the transmitter comprising: an address encoding module configured to encode an address associated with the communication via the sequence of gradients of the symbols in the chirp signal; a data encoding module configured to encode data in the chirp signal via the symbol value of each chirp; and a transmitting module configured to transmit the data chirp signal to the receiver.

20 Claims, 6 Drawing Sheets

US 8,718,117 B2

CHIRP COMMUNICATIONS

CROSS-REFERENCE TO RELATED APPLICATIONS

The present application claims priority to GB 1106609.9 filed Apr. 19, 2011 and GB 1107562.9 filed May 6, 2011, the contents of which are incorporated herein by reference in their entirety.

FIELD OF THE INVENTION

The present disclosure relates to chirp communications, and in particular to addressing chirp communications to a receiver.

BACKGROUND OF THE INVENTION

The chirp modulation method is a modulation method in which the frequency of a signal (chirp) varies linearly over time in a bandwidth of Fs Hz. A chirp having a positive gradient in the frequency-time plane is generally referred to as an up-chirp, for example chirp 1 and chirp 2 on FIG. 1. A chirp having a negative gradient in the frequency-time plane is generally referred to as a down-chirp, for example chirp 3 on FIG. 1.

A chirp can be represented by a sequence of N samples. One or more identical contiguous chirps can form a symbol that represents a data value to be communicated. A chirp can be represented mathematically as:

$$C(g,p) = e^{j\pi g(n-fn(p))(n+1-fn(p))/N} \quad \text{(equation 1)}$$

where g is the gradient of the chirp, N is the number of samples in the sequence, n is a sample in the sequence, p is the symbol's value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1. Due to the modular nature of this expression negative gradients are obtained from N−1 backwards. Hence, N−2 is equivalent to a negative gradient of −2. Where there are more than one identical contiguous chirps in a symbol, each chirp individually conveys the same value which is the symbol value of the symbol.

Chirp 1 in FIG. 1 has a starting frequency of −Fs/2 and a gradient of 1. It increases linearly in frequency over a period of N samples at a sample rate of Fs to reach a frequency close to +Fs/2. Since this is a complex sampled system +Fs/2 is the same as −Fs/2. Multiple chirps are usually contiguous but may start with a different frequency. The signal phase is typically made continuous throughout a sequence of chirps. In other words, after the signal has reached +Fs/2 at n=N−1, the next symbol starts with n=0 again. FIG. 1 illustrates an example in which two consecutive chirps have the same symbol value, whereas the third chirp is different. An apparent discontinuity in frequency between chirp 1 and chirp 2 occurs at n=N.

Chirp 4 in FIG. 2 has a gradient of 2 and a starting frequency of −Fs/2. Because it has double the gradient of the chirps of FIG. 1, it increases linearly in frequency to +Fs/2 in half the number of samples that the chirps in FIG. 1 do, i.e. it reaches close to +Fs/2 after close to N/2 samples. The chirp then wraps around in frequency. Since this is a sampled system, these frequency wraps are in effect continuous and have continuous phase. The chirp repeats the frequency sweep from −Fs/2 to +Fs/2 between samples N/2 and N.

The chirps also have continuous frequency and phase from one end of the chirp to the other. A cyclic shift of the samples that make up a chirp creates another valid chirp.

In communications systems in which a transmitting device desires to communicate with a specific remote device, the transmitting device "addresses" the remote device in order to establish a connection with that remote device. It is known to address a specific device by using a specific frequency associated with that device. This approach is problematic because the number of receivers that the transmitting device can address is limited by the number of distinct frequencies available. More advanced schemes involve a transmitter broadcasting an "address" packet identifying a specific device it wants to connect to. A plurality of devices receive the address packet and decode it in order to determine if the following transmission is intended for them. The identified device then continues to receive the remaining transmission from the transmitter. In a modification of this approach, it is known to include the receiver's address in the header of a packet, the payload of which includes the message to be communicated to that specific device. In both of these two latter approaches, part or whole packets which could otherwise have been used to carry traffic data, are used solely to carry addressing information.

Using whole or part packets for addressing is suitable for systems utilising high data rates, and operating on devices having large energy reserves. However, chirp communications are typically used in systems operating using low data rates and short messages and in environments where there could be multiple simultaneous transmitting devices. When operating using low data rate chirp signals, using part or whole chirp signals to carry the address of the receiver further significantly reduces the amount of traffic data that can be carried by the chirp signals. Additionally, chirps signals are typically communicated between low power devices, for example battery powered handheld devices. The processing power required to decode the addressing chirps in addition to the chirps carrying traffic data is an additional source of power drain for a low power device. Furthermore, low power receivers are typically only able to listen to a single transmitter at a time. When there are many transmitting devices, particularly when they are using the same frequency, a receiver may find itself receiving and decoding the addresses of many messages, most of which will be unwanted. Not only is this an additional power drain, the receiver may miss a wanted message because it happened to be receiving and decoding an unwanted message at that time.

Thus, there is a need for an improved method of addressing chirp communications to a particular receiver which is suitable for systems operating using low data rates, low power and short messages and in environments where there could be multiple simultaneous transmitting devices.

SUMMARY OF THE INVENTION

According to a first aspect, there is provided a transmitter configured to communicate a data chirp signal to a receiver, the chirp signal comprising at least one symbol, each symbol comprising one or more identical chirps, each symbol having a different gradient to another symbol in the chirp signal, each chirp encoding a symbol value, the transmitter comprising: an address encoding module configured to encode an address associated with the communication via the sequence of gradients of the symbols in the chirp signal; a data encoding module configured to encode data in the chirp signal via the symbol value of each chirp; and a transmitting module configured to transmit the data chirp signal to the receiver.

Suitably, the address encoding module is further configured to encode the address associated with the communication via a frequency hopping sequence of the chirp signal.

Suitably, the address associated with the communication is an address of the receiver.

Suitably, the transmitter is further configured to communicate with one or more further receivers, the address encoding module further configured to encode each receiver's address via a different sequence of gradients of the symbols in the chirp signal.

Suitably, the address associated with the communication is an address of the transmitter.

Suitably, each chirp is represented by a sequence of N samples, the N samples being cyclically shiftable such that the symbol value of the chirp is defined by the cyclic phase of the N samples.

Suitably, the symbol value of a chirp is defined by the equation:

$$C(g,p)=e^{j\lambda g(n-fn(p)(n+1-fn(p))/N}$$

where C is the chirp sequence, g is the gradient of the chirp, n is a sample in the chirp sequence, p is the symbol value, and N is the number of samples in the sequence.

According to a second aspect, there is provided a receiver configured to receive a data chirp signal from a transmitter, the chirp signal comprising at least one symbol, each symbol comprising one or more identical chirps, each symbol having a different gradient to another symbol in the chirp signal, each chirp encoding a symbol value, the receiver comprising: a receiving module configured to receive the data chirp signal from the transmitter; an address decoding module configured to decode an address associated with the communication from the sequence of gradients of the symbols in the chirp signal; and a data decoding module configured to decode data in the chirp signal from the symbol value of each chirp.

Suitably, the address decoding module is further configured to decode the address associated with the communication via a frequency hopping sequence of the chirp signal.

Suitably, the receiver is configured to cease decoding the chirp signal on determining that the sequence of gradients of the symbols in the chirp signal does not match the sequence of gradients of the address associated with the communication.

Suitably, the receiver further comprises a synchronisation module configured to synchronise the receiver to the data chirp signal using at least one symbol having a gradient of the sequence of gradients encoding the address associated with the communication.

According to a third aspect, there is provided a method of communicating a data chirp signal to a receiver, the chirp signal comprising at least one symbol, each symbol comprising one or more identical chirps, each symbol having a different gradient to another symbol in the chirp signal, each chirp encoding a symbol value, the method comprising: at the transmitter, encoding an address associated with the communication via the sequence of gradients of the symbols in the chirp signal; at the transmitter, encoding data in the chirp signal via the symbol value of each chirp; and transmitting the data chirp signal to the receiver.

Suitably, the method further comprises: receiving the data chirp signal from the transmitter; at the receiver, decoding the address associated with the communication from the sequence of gradients of the symbols in the chirp signal; and at the receiver, decoding data in the chirp signal from the symbol value of each chirp.

Suitably, the method further comprises ceasing decoding the chirp signal on determining that the sequence of gradients of the symbols in the chirp signal does not match the sequence of gradients of the address associated with the communication.

Suitably, the method comprises further encoding the address associated with the communication via a frequency hopping sequence of the chirp signal.

Suitably, the method further comprises communicating with one or more further receivers, wherein at the transmitter encoding each receiver's address via a different sequence of gradients of the symbols in the chirp signal.

Suitably, the method further comprises synchronising the receiver to the data chirp signal using at least one symbol having a gradient of the sequence of gradients encoding the address associated with the communication.

BRIEF DESCRIPTION OF THE DRAWINGS

The following disclosure will now be described by way of example with reference to the accompanying drawings. In the drawings.

DETAILED DESCRIPTION

Figure 1:
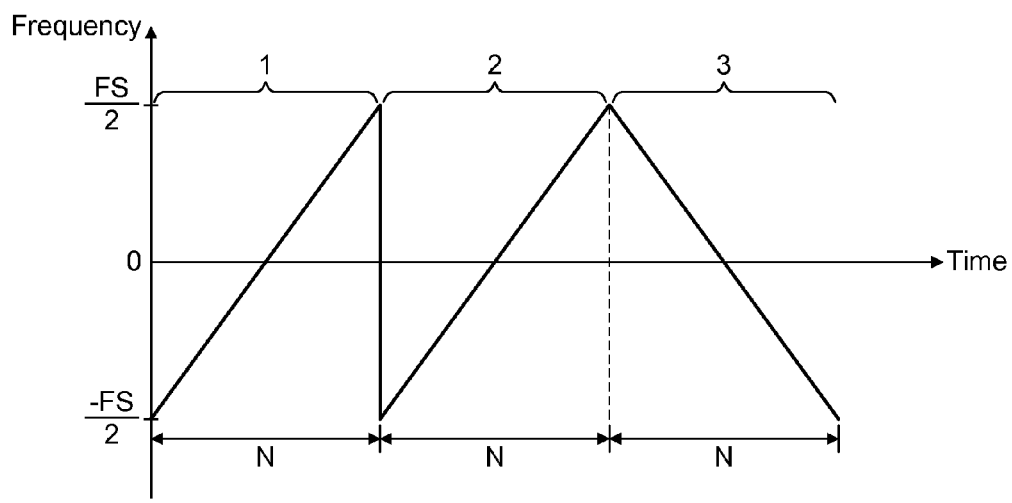
FIG. 1 illustrates a sequence of chirps in the frequency-time plane.
Figure 2:
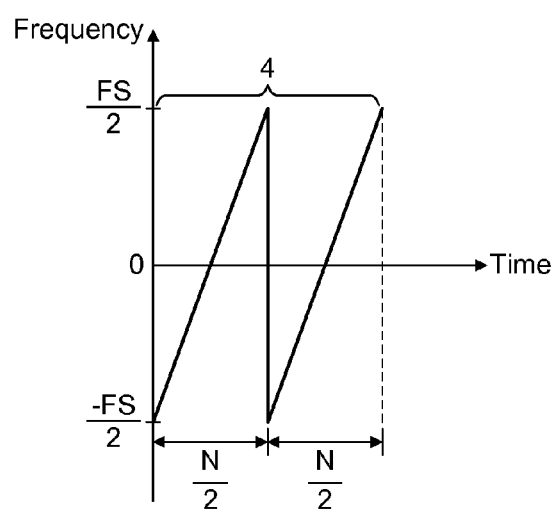
FIG. 2 illustrates a chirp having a gradient of 2 in the frequency-time plane.

The following disclosure is directed at a chirp communication method for communicating a data chirp signal from a transmitter to a receiver. Suitably, the communication is to a specifically addressed receiver. Alternatively, the communication is to one or more of a plurality of receivers in a broadcast connection. The data chirp signal comprises a plurality of symbols. Each symbol comprises one or more identical chirps. Each symbol has a gradient that may be different to other symbols in the chirp signal. An address associated with the communication is encoded via the sequence of gradients of the symbols in the chirp signal. Alternatively, the address associated with the communication is encoded via both the sequence of gradients of the symbols in the chirp signal and the frequency hopping sequence of the chirp signal. Suitably, the address associated with the communication is the receiver's address. Alternatively, in a broadcast connection, the address associated with the communication is the transmitter's address. The traffic data is encoded via the symbol value of each symbol in the chirp signal. The traffic data is different to the address data. The transmitter is configured to transmit a data chirp signal encoded in this way, and the receiver is configured to receive a data chirp signal encoded in this way. This process will be described further in the examples that follow.

As previously described, a chirp in the chirp signal can be represented by a sequence of N samples. One or more identical contiguous chirps can form a symbol that represents a data value to be communicated. Mathematically, a chirp signal can be represented as:

$$C(g,p) = e^{j\pi g(n-fn(p))(n+1-fn(p))/N} \quad \text{(equation 1)}$$

where g is the gradient of the chirp, N is the number of samples in the sequence, n is a sample in the sequence, p is the symbol's value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1. Due to the modular nature of this expression negative gradients are obtained from N−1 backwards. Hence, N−2 is equivalent to a negative gradient of −2. Where there are more than one identical contiguous chirps in a symbol, each chirp individually conveys the same value which is the symbol value of the symbol.

Chirps have several properties which are configurable by a transmitter. One such property is the symbol value p. The N samples of a chirp are cyclically shiftable. For example, the particular cyclically shifted position of the samples in a chirp relative to a default position can be used to define the symbol value. In other words the cyclic phase of the N samples of a chirp can be related to the symbol value. There are N different cyclic phases of a chirp, and hence, in this example, there are N different possible symbol values. Suitably, the symbol value p is used to convey data. The amount of data that is conveyed by the symbol value of one symbol depends on the value of N. For example, if N is 257 then there are 257 different possible symbol values. Consequently, the detected symbol value could be used to convey approximately 8 bits of data. For example, if p is 10 then this could be interpreted as the 8 bits 00001010. Similarly, if p is 40 then this could be interpreted as the 8 bits 00101000. Further bits can be encoded by whether the chirp is an up-chirp or a down-chirp.

Figure 3:
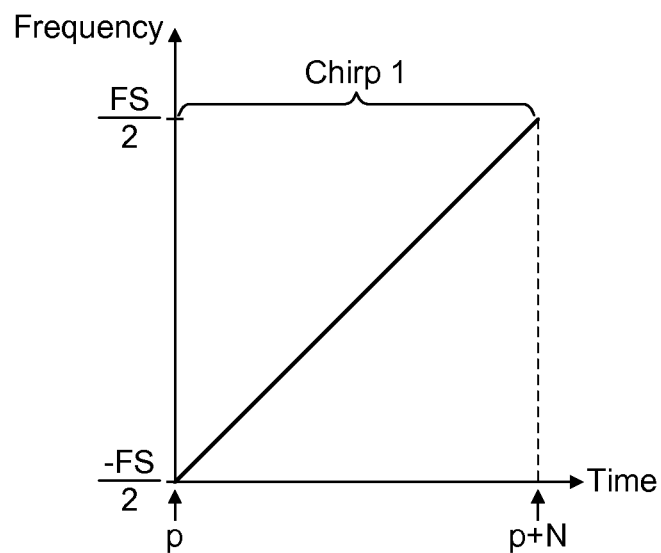
FIG. 3 illustrates encoding data via the starting frequency of a chirp.
Figure 3:
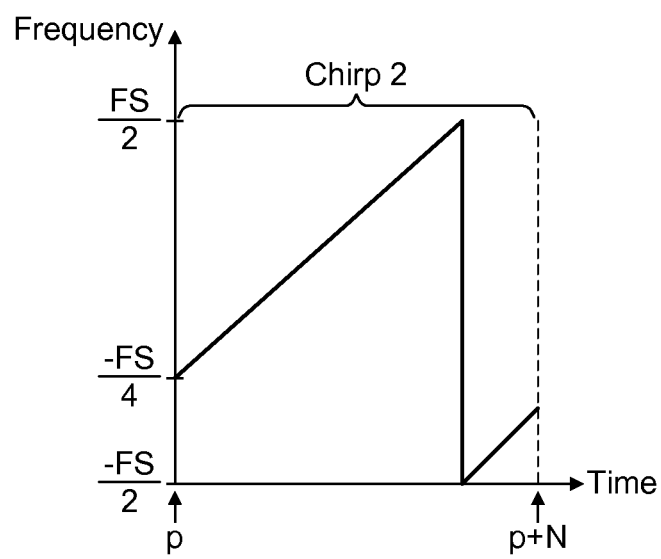

Suitably, the symbol's value p is used to convey data. Suitably, this is achieved by controlling the starting frequency of the chirp. Alternatively, this is achieved by evaluating equation 1 using the selected p values. FIG. 3 illustrates the concept of using the symbol value p to convey data by showing two chirps both having unity gradient. Chirp 1 has a starting frequency of −Fs/2. The symbol value p of chirp 1 is such that the chirp increases in frequency to +Fs/2 over N samples. Chirp 2 has a starting frequency of −Fs/4. The symbol value p of chirp 2 is such that the chirp increases in frequency to +Fs/2 in less than N samples and then drops down to −Fs/2 and returns to −Fs/4 after N samples. Suitably, the chirp receiver detects the symbol value of each symbol in the chirp signal in order to decode the data in the chirp signal.

The gradient of each symbol of the chirp signal is configurable by the transmitter. Suitably, in a peer to peer connection method, the sequence of gradients of the symbols in the chirp signal is used to identify the receiver being addressed. Suitably, the transmitter encodes the symbols in the chirp signal with the sequence of gradients which identify the receiver it is trying to communicate with. Thus, the transmitter uses a different sequence of gradients for communicating with different receivers, each sequence of gradients specific to the receiver being addressed. Similarly, each receiver is configured to receive chirp signals encoded with the sequence of gradients identifying that receiver.

Figure 4:
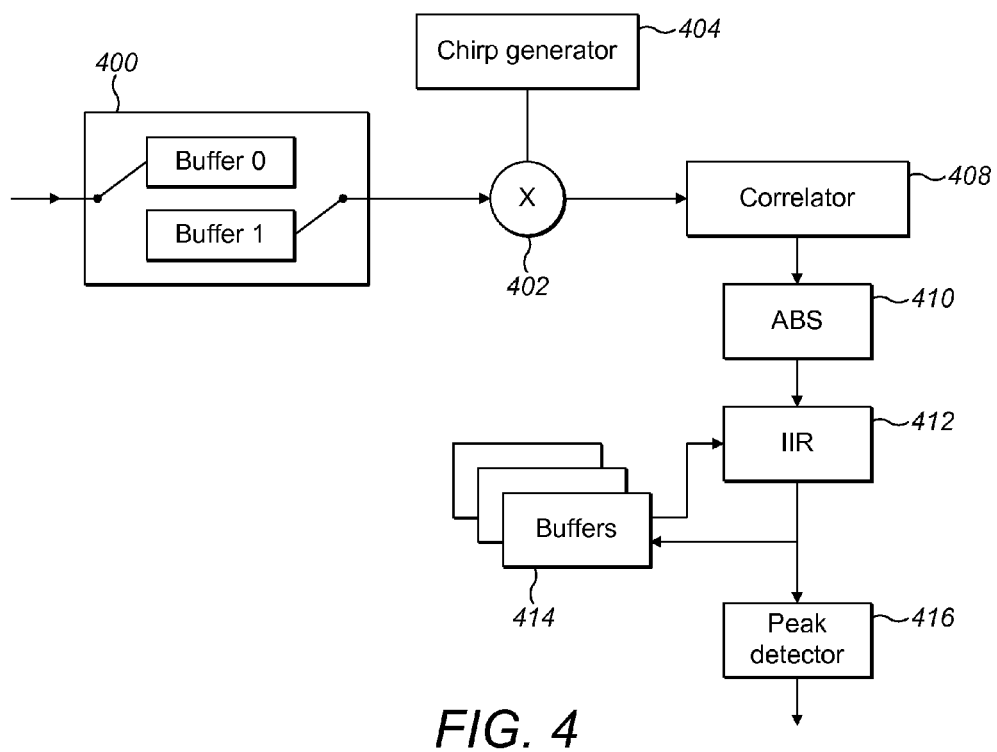
FIG. 4 illustrates a schematic diagram of the exemplary components of a chirp receiver.

Suitably, in a broadcast connection method the broadcast transmitter transmits using a publically known address. The value of the address is associated with its particular purpose. For example, a broadcast transmitter for use in providing positioning information uses one of a set of predefined addresses reserved for positioning systems. A receiver for receiving such a broadcast message is configured to receive chirp signals encoded with the sequence of gradients that match the publicly known address associated with that broadcast message. This address may be that of a specific broadcast transmitter. Alternatively, this address may be that of a group of broadcast transmitters. Reference is now made to FIG. 4 which is a schematic diagram of the exemplary components of a chirp receiver.

A chirp signal is received at the chirp receiver and the samples of a received chirp of the chirp signal are input to buffer module 400. Suitably, buffer module 400 comprises two buffers. This enables an input buffer to be receiving samples whilst the output buffer is being read. When the input buffer becomes full the two buffers are swapped over so that input samples can continue to be sampled and stored without loss. If one of a set of chirp gradients are expected, for example when decoding additional symbol bits by using 2^K gradients to represent K bits of additional information, or when wanting to communicate with one of a number of devices with different predefined gradients, then the output buffer may be read multiple times, once for each possible gradient. With suitably fast digital processing clock rates these buffers can provide a means to decode and track received chirps in real time. The received chirp samples output from the buffer module 400 are input to chirp multiplier 402.

Chirp generator 404 generates a reference chirp which has a gradient g' which differs from the gradient g of the chirp output from the buffer module 400 by a fixed value v. Preferably, this fixed value is 1. Preferably, g−g'=1. Preferably, the reference chirp has the same number of samples in a chirp N, sample rate (bandwidth) and centre frequency as the chirp output from the buffer module 400. Suitably, the receiver operates according to a protocol in which the gradient, the sample rate, the number of repeats of a chirp in a symbol, the number of samples N in a chirp, and the frequency hopping sequence of each symbol in the chirp signal are known by the receiver in advance of receiving the chirp signal. These properties may be defined by the protocol. These properties may be publicly known. Alternatively, one or more of these properties may be negotiated between the transmitter and the receiver in advance of communication of the chirp signal.

The chirp multiplier 402 multiplies the received chirp with the conjugate of the reference chirp generated by chirp generator 404. The mixed chirp output from the chirp multiplier 802 is input to correlator 408.

Figure 5:
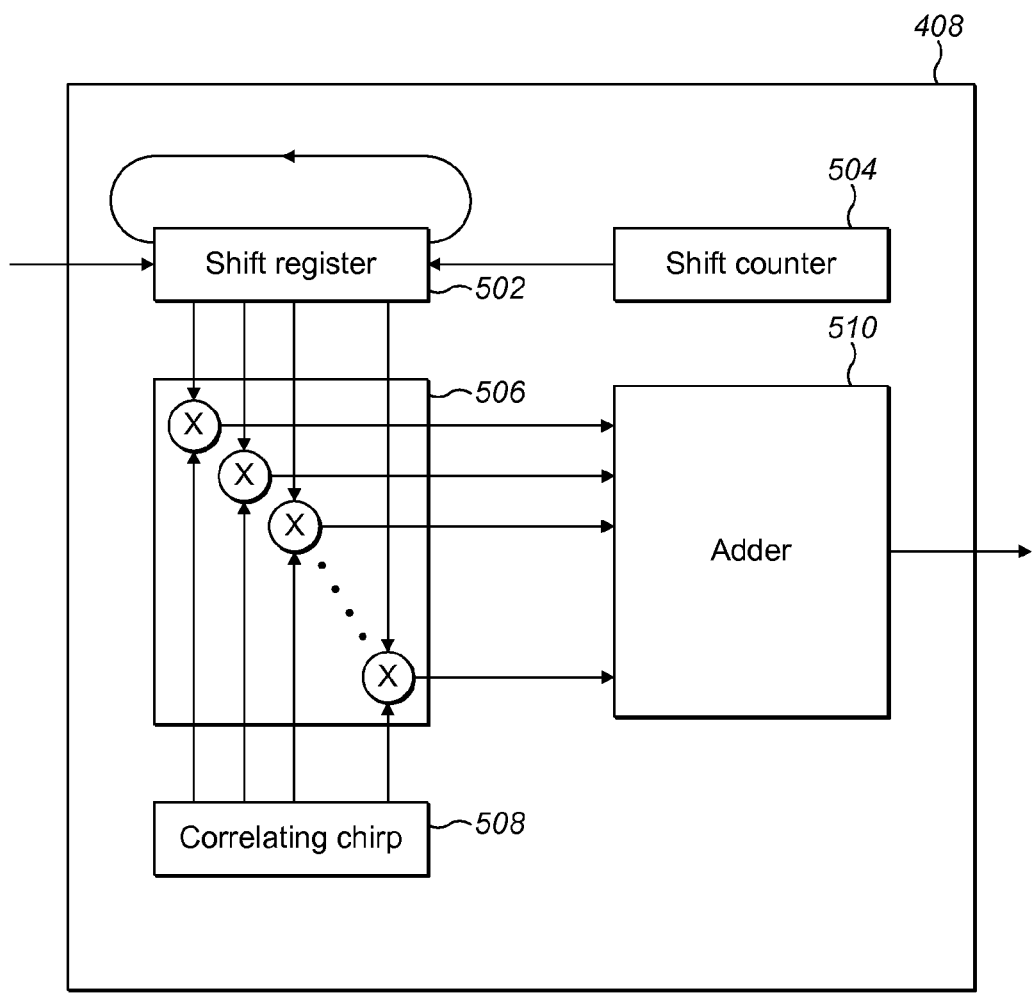
FIG. 5 illustrates a schematic diagram of a chirp correlator.

The correlator 408 correlates the mixed chirp with the conjugate of a fixed correlating chirp. The fixed correlating chirp has a gradient which is equal to the fixed value v. Preferably, the fixed correlating chirp has unity gradient. FIG. 5 illustrates a more detailed diagram of an exemplary correlator 408. The N samples of the mixed chirp signal output from chirp multiplier 404 are first loaded into N-stage circular shift register 502. The fixed gradient correlating chirp signal consists of one chirp of N samples which are preloaded into correlating chirp module 508. The shift counter 504 is preloaded with the number of shifts, and hence the number of outputs of correlator 408. During normal operation shift counter 504 is preloaded with N, but when using reduced symbol alphabets or if N is non-prime then shift counter 504 could be less than N. The correlator 408 comprises N complex multipliers 506, each taking a complex input from the N-stage circular shift register 502 samples, and the corresponding complex input from the correlating chirp module 508. The output from the N complex multipliers is then summed at adder 510 to yield a single complex correlator sample that is output from the correlator 408. For each successive correlation, the N-stage circular shift register 502 rotates by one. If the sample at the beginning of the N-stage circular shift register is s for one correlation, then the sample at the beginning of the N-stage circular register is s−1 for the next correlation. In this way, the correlator performs a correlation between the fixed gradient correlating chirp and N cyclic phases of the mixed chirp, generating N outputs. When the received chirp, the reference chirp and fixed correlating chirp have gradients such that $g-g'\neq v$, then the correlator outputs small values for all cyclic phases. This is the case when the chirp receiver is not configured to correctly receive the chirp signal. When the received chirp, the reference chirp and fixed correlating chirp have gradients such that $g-g'=v$, the correlator outputs a strong correlation peak when the cyclic phase of the mixed chirp matches that of the fixed gradient correlating chirp and smaller values in other positions. In this way, the position of the correlation peak identifies the symbol value of the chirp. The data encoded in the chirp is then determined from the symbol value of the chirp.

Suitably, the output of the correlator 408 is input to an absolute value module 410. The absolute value module returns the magnitude of the complex input signal from the correlator 408. Suitably, the output of absolute value module 810 is input to an integrator 412. In some transmitter receiver configurations the received chirp signal comprises a set of individual chirps which are all identical, i.e. they have the same gradient and symbol value. The integrator is configured to integrate the corresponding correlator outputs of each of the individual chirps. So, for example, the integrator integrates the correlator output of each individual chirp for the case when the N-stage circular shift register is in the position s=1. Similarly, the integrator integrates the correlator output of each individual chirp for the case when the N-stage circular shift register is in the position s=2, and so on. The integrator performs the integration by storing the N samples of the correlator output for a specific s position of the first chirp in the set in the buffers 414. It then retrieves these stored N samples from buffers 414 and performs an average of them with the N samples of the corresponding correlator output of the second chirp in the set. It then stores this averaged output in the buffers 414. It then retrieves these stored N samples from buffers 414 and performs an average of them with the N samples of the corresponding correlator output from the third chirp in the set. The iteration continues until all the chirps in the chirp set have been integrated. This integration technique is non-coherent integration. In one approach all the samples from repeated chirps are stored in memory, before an average is performed. Alternatively, if memory is limited the integrator might perform the average using N IIR (infinite impulse response) filters, with coefficients suitably chosen for the expected number of identical chirps in a symbol.

In an alternative implementation, the receiver device of FIG. 4 may be modified such that the absolute value module 410 is after the integrator 412. In this case the integrator 412 is a complex integrator. In this case the integration technique is coherent integration.

For the case where the frequency drift between transmitter and receiver is sufficiently small, this integrated output results in more accurate correlation peak detection, which is performed in peak detection module 416.

The receiver operates according to a protocol in which the gradient, the sample rate, the number of repeats of a chirp in a symbol, the number of samples N in a chirp, and the centre frequency of each symbol in the chirp signal are known by the receiver in advance of receiving the chirp signal. This enables the receiver to generate the correct reference chirp, and to correctly correlate the mixed chirp with the fixed gradient correlating chirp. If the receiver generates the wrong reference chirp, for example one with the wrong gradient, then the correlator output does not have correlation peaks which enable the receiver to determine the data encoded in the chirp signal.

Figure 6:
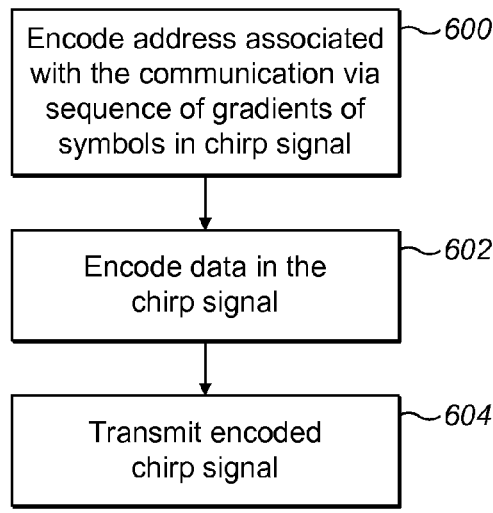
FIG. 6 is a flow chart illustrating a method of communicating a data chirp.

FIG. 6 illustrates a method of communicating a data chirp signal to a receiver. At step 600, the transmitter encodes an address associated with the communication via the sequence of gradients of the symbols in the chirp signal. Suitably, the address is that of the receiver. Suitably, in a broadcast transmission, the address is the publically known address of the broadcast transmitter. Each receiver has a different sequence of gradients defining its address. The address of each receiver in the system may be public. For example, the address of each receiver may be defined by the protocol. Alternatively, the address of the receiver may be negotiated between the transmitter and the receiver in advance of the communication of the chirp signal. The transmitter selects the gradients of the symbols in the chirp signal so as to match the sequence of gradients defining the address associated with the communication. Suitably, the gradient of each symbol is selected to be greater than 0 and less than N. At step 602, the transmitter encodes data via the symbol values of each chirp signal as previously described. Alternatively, equation 1 is evaluated in order to encode data and the address in the chirp signal. In this case steps 600 and 602 are carried out contemporaneously by evaluating equation 1. At step 604, the transmitter transmits the encoded chirp signal to the receiver. Suitably, the transmitter transmits packets. Suitably, each packet has a synchronisation header followed by a payload. The payload comprises the encoded chirp signal. No sequence of steps is implied by FIG. 6. The transmitter may encode the address associated with the communication onto the chirp signal prior to, at the same time, or after encoding the traffic data onto the chirp signal.

Typically, the length of an address is between 16 and 64 bits. For example, when N is 257, there are 257 possible gradients, which can convey 8-bits of address data. Hence, between 2 and 8 symbols with specified gradients convey the address information. The gradient of subsequent symbols may then revert to a predefined sequence or one of a number of predefined sequences. Multiple predefined sequences allow additional control bits to be transmitted in parallel with the normal payload.

Suitably, the transmitter communicates with a plurality of receivers. For example, the transmitter may communicate with different receivers in different timeslots. Suitably, the transmitter encodes the chirp signal to each receiver with that receiver's address by setting the sequence of gradients of the chirp signal to match the sequence of gradients defining the address of that receiver. Alternatively, the transmitter may transmit to different receivers in the same timeslot using a broadcast message. Suitably, the transmitter encodes the chirp signal to each receiver with the transmitter's address by setting the sequence of gradients of the chirp signal to match the sequence of gradients defining the address of the transmitter.

Suitably, the address associated with the communication is encoded by a combination of the sequence of gradients of the symbols in the chirp signal and the frequency hopping sequence of the chirp signal. Suitably, the frequency hopping sequence defines the centre frequency of each symbol, such that the centre frequency of each symbol may be different to other symbols in the chirp signal. Suitably, the transmitter and receiver pre-agree the frequency hopping sequence. The frequency hopping sequence may be negotiated between the transmitter and the receiver in advance of the communication of the chirp signal. The frequency hopping sequence may be defined by the protocol. Alternatively, the frequency hopping sequence may be statically defined in advance as part of a broadcast addressing scheme. To cater for local interference, one of a number of known frequency hopping sequences may be used. Suitably, consecutive symbols have centre frequencies matching consecutive hops in the frequency hopping sequence.

In an exemplary system, prior to decoding the address, a receiver is first synchronised to a received chirp signal from a transmitter. Alternatively, the synchronisation can be combined with address decoding so that some or all of the symbols that form the address are also used to obtain synchronisation. Synchronisation comprises identifying the symbol time offset and frequency offset between the transmitter and receiver. Following this identification, the chirp receiver corrects the frequency offset and aligns the symbol edges in order to correct the time offset. Synchronisation may be achieved by using a public training sequence prefixed to all messages in the system. Such synchronisation techniques are known in the art.

Alternatively, synchronisation is achieved by prefixing chirp messages with multiple synchronisation symbols. Each symbol comprises more than one chirp. Preferably, the gradients and symbol values of the chirps are known. Some or all of these synchronisation symbols may also be used to form part of the address, using the chirp gradient as previously described, but with a fixed and known value. Preferably, this value is 0. Chirp signals comprise a signal that changes frequency linearly over time. Hence, when a chirp signal is subject to both a timing and frequency offset, the chirp signal is altered according to a predictable model. When several contiguous chirp symbols, with different respective gradients, are each mixed and correlated as depicted in FIG. 4, the number and position of the corresponding correlator output peaks is recorded. If the wrong sequence of gradients is received the correlator does not output sufficient peaks and the receiver does not synchronise. In this case the synchronisation process is restarted from the first expected synchronisation symbol. If the correct sequence of gradients is received the correlator does output one or more peaks for each synchronisation symbol. Suitably, an error value can be constructed between the observed peak positions and those from the predictable model, when subject to a frequency and time offset hypothesis. Suitably, this error signal can be minimised by adjusting the frequency and time hypothesis and re-evaluating the model. In practice, due to the modular nature of the problem, the unknowns also include an integer wrap value for each chirp's peak position, which is also hypothesised. Thus, multiple minimisations are made for all possible integer wrap combinations. The unknown parameter set with the overall lowest error is chosen. This approach has the advantage of making the problem resilient to errors in whole chirp periods when measuring peak positions. Suitably, an additional synchronisation symbol to select a particular chirp is added to the chirp signal. Alternatively, this additional symbol could form part of the subsequent message or remaining address symbols.

Each receiver is configured to receive a chirp signal comprising symbols having the sequence of gradients defining the address associated with the communication. For example, the address may be defined by the gradient sequence 6, 2, 220, 1, 41, 5. In this case, the chirp generator 404 of the receiver may be configured to generate reference chirps having the gradient sequence 5, 1, 219, 0, 40, 4. Following synchronisation, the chirp receiver feeds chirp signals to the chirp mixer and correlator. The chirp mixer is fed with reference chirp signals generated with the expected gradient sequence. Should all expected gradients match in order then the correlator will generate the corresponding number of peaks. The processor detects these peaks and may decide that it has received the correct address. The positions of these peaks are also the symbol values of the first symbols of the packet. Hence, the address information has cost very little in time or processing power. The remainder of the packet may then be read and decoded as previously described. The combining of address and data bits within a single symbol is particularly significant in short messages that may only comprise a few bits.

Alternatively, should one or more of gradients of the received chirps not match the expected gradients then the corresponding correlator outputs will not generate a peak. The processor may interpret this as meaning that the address is invalid. Suitably, the processor decides to resynchronise after the first missing peak. Alternatively, the processor may permit a few missing peaks before resynchronising. This minimises the time when the receiver is unavailable to listen for messages addressed to it. Suitably, the receiver empties buffer module 400 of any remaining received signal after determining that the signal was not addressed to it.

By combining address and data bits in a single symbol period and aborting the address detection at the earliest possible moment, wasted power and time is kept to a minimum. This is a key consideration in a low power system where multiple devices may be transmitting simultaneously and on the same frequency.

Figure 7:
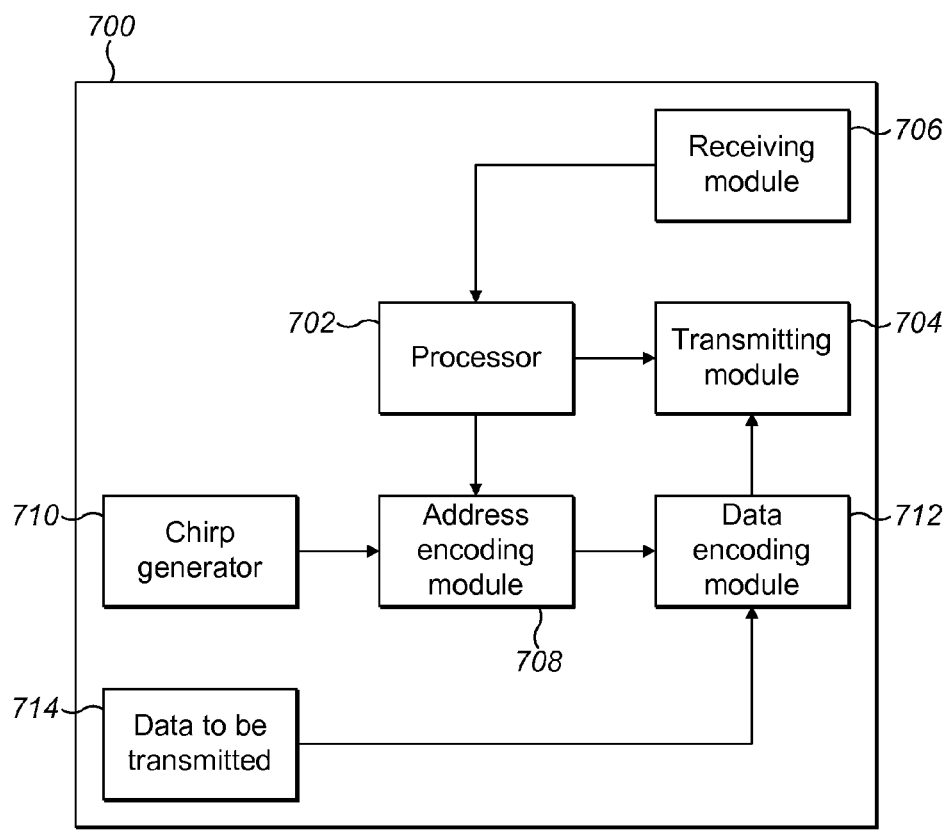
FIG. 7 illustrates a schematic diagram of the exemplary components of a chirp transmitter.

FIG. 7 illustrates a schematic diagram of an exemplary transmitter according to the methods described herein. If the address associated with the communication is negotiated between the transmitter and the receiver in advance of the communication of the chirp signal, the negotiating communications are transmitted to a receiver by transmitting module 704 and negotiating communications from a receiver are received by receiving module 706. Processor 702 of transmitter 700 is configured to perform these negotiating steps. Processor 702 is further configured to inform address encoding module 708 of the address associated with the communication that the transmitter is to communicate with. Address encoding module 708 is configured to encode chirps generated by chirp generator 710 as instructed by processor 702. Data encoding module 712 is configured to encode data to be transmitted 714 via the symbol value of each chirp. Transmitting module 704 then transmits the encoded chirp signal to the receiver.

Figure 8:
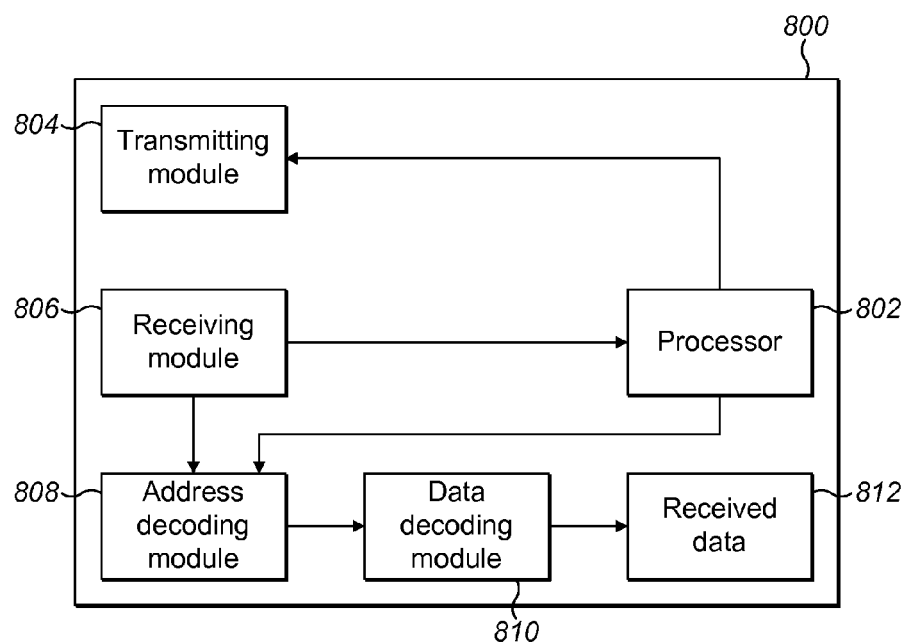
FIG. 8 illustrates a schematic diagram of the exemplary components of a chirp receiver.

FIG. 8 illustrates a schematic diagram of an exemplary receiver according to the methods described herein. If the address associated with the communication is negotiated between the transmitter and the receiver in advance of the communication of the chirp signal, the negotiating communications are transmitted to a transmitter by transmitting module 804 and negotiating communications from a transmitter are received by receiving module 806. Processor 802 of receiver 800 is configured to perform these negotiating steps.

Suitably, receiving module 806 comprises module 400 of FIG. 4. Address decoding module 808 is configured to decode chirps as instructed by processor 802. Suitably, the address decoding module 808 comprises chirp generator 404 and chirp multiplier 402 of FIG. 4. Data decoding module 810 is configured to decode data in the chirp signal via the symbol value of each chirp. Suitably, decoding module 810 comprises correlator 408, absolute value module 410, integrator 412 and 414 and peak detector 416 of FIG. 4. The receiver thereby determines the received data 812.

FIGS. 4, 5, 7 and 8 illustrate schematic diagrams showing exemplary components of receivers, a correlator and a transmitter according to the methods described herein. These figures illustrate the layout of these devices in terms of functional boxes. The operations of one or more of these functional boxes may be combined. For example, suitably in the transmitter, the operations of the address encoding module, data encoding module and chirp generator are performed in combination by the chirp generator. In this example, the data to be transmitted and the address parameter are inputs to the chirp generator. The chirp generator then generates a traffic data and address encoded chirp or chirps in accordance with the inputs to the chirp generator. Suitably, the transmitting module receives the generated chirp or chirps and the centre frequency, which it mixes prior to transmitting the mixed output to a receiver. It will be understood that these figures do not illustrate those conventional components of these devices known to a person skilled in the art.

In a specific example, the data chirp signal to be communicated comprises chirps, wherein each chirp is described by a Zadoff-Chu code.

Suitably, contiguous symbols have different Zadoff-Chu codes. The gradients of contiguous symbols can be different. The sequence of gradients, and hence the sequence of Zadoff-Chu codes is determined by the address of the communication. Suitably, contiguous symbols also have different centre frequencies as defined by a frequency hopping sequence. Using different Zadoff-Chu codes for each symbol provides a degree of coded separation, allowing more than one user to use the frequency spectrum at the same time.

The communication method described herein is a lower power method than the described prior art method. A receiver's address is contained within one property of the chirps in the chirp signal (i.e. the gradient), whilst the traffic data is contained within another property of the chirps in the chirp signal (i.e. symbol value of the chirps). Suitably, there is no specific frequency reserved for communication with a specific device. Therefore many devices may use the same frequency at the same time. Additionally, suitably there are no additional chirps used in the chirp signal for solely addressing the receiver. The same chirps are used to both address the receiver and convey traffic data. This is particularly effective for low data rate systems using short messages, because it enables more of the chirp signal to be dedicated to traffic data than in the described prior art systems. Using different sequences of gradients to address different receivers provides a means of individually addressing a large number of receivers due to the large number of distinct permutations of the sequence of gradients. If the sequence of gradients is used in addition to a frequency hopping sequence in order to address a specific device, then the number of individually addressable receivers increases even more due to even more distinct permutations of the variables.

Suitably, the receiver and transmitter described herein are implemented in a system operating according to Bluetooth protocols.

Preferably, the receiver and transmitter described herein are implemented in hardware. Alternatively, the receiver and transmitter described herein may be implemented in software.

Suitably, the receiver and transmitter described herein are implemented in long range radio communications. Typically, chirps are used for implementations that use a low data rate and low power. The receiver and transmitter are suitable for use in high-sensitivity radio communications. Example implementations of the receiver and transmitter are in a temperature sensor, a walkie talkie or a wireless headset.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A transmitter configured to communicate a data chirp signal to a receiver, the data chirp signal comprising at least one symbol, each of the symbols comprising one or more identical chirps, each of the symbols having a different chirp gradient than at least one other symbol in the data chirp signal, each of the chirps encoding a symbol value, the transmitter comprising:
 an address encoding module configured to encode an address associated with the communication via the sequence of gradients of the symbols in the data chirp signal;
 a data encoding module configured to encode traffic data in the data chirp signal via the symbol value of each chirp; and
 a transmitting module configured to transmit the data chirp signal to the receiver,
 wherein at least a portion of the address and at least a portion of the traffic data are encoded on the same chirp.

2. A transmitter as claimed in claim 1, wherein the address encoding module is further configured to encode the address associated with the communication via a frequency hopping sequence of the data chirp signal.

3. A transmitter as claimed in claim 1, wherein the address associated with the communication is an address of the receiver.

4. A transmitter as claimed in claim 3, further configured to communicate with one or more further receivers, the address encoding module further configured to encode each receiver's address via a different sequence of gradients of the symbols in the data chirp signal.

5. A transmitter as claimed in claim 1, wherein the address associated with the communication is an address of the transmitter.

6. A receiver configured to receive a data chirp signal from a transmitter, the data chirp signal comprising at least one symbol, each of the symbols comprising one or more identical chirps, each of the symbols having a different chirp gradient than at least one other symbol in the data chirp signal, each of the chirps encoding a symbol value, the receiver comprising:
 a receiving module configured to receive the data chirp signal from the transmitter;
 an address decoding module configured to decode an address associated with the communication from the sequence of gradients of the symbols in the data chirp signal; and a data decoding module configured to decode traffic data in the data chirp signal from the symbol value of each chirp; and wherein at least a portion of the address and at least a portion of the traffic data are decoded from the same chirp.

7. A receiver as claimed in claim 6, wherein the address decoding module is further configured to decode the address associated with the communication via a frequency hopping sequence of the data chirp signal.

8. A receiver as claimed in claim 6, configured to cease decoding the data chirp signal on determining that the sequence of gradients of the symbols in the chirp signal does not match the sequence of gradients of the address associated with the communication.

9. A receiver as claimed in claim 6, wherein the address associated with the communication is an address of the receiver.

10. A receiver as claimed in claim 6, wherein the address associated with the communication is an address of the transmitter.

11. A receiver as claimed in claim 6, further comprising a synchronisation module configured to synchronise the receiver to the data chirp signal using at least one symbol having gradient of the sequence of gradients encoding the address associated with the communication.

12. A method of communicating a data chirp signal to a receiver, the data chirp signal comprising at least one symbol, each of the symbols comprising one or more identical chirps, each of the symbols having a different chirp gradient than at least one other symbol in the data chirp signal, each of the chirps encoding a symbol value, the method comprising:
    at the transmitter, encoding an address associated with the communication via the sequence of gradients of the symbols in the data chirp signal;
    at the transmitter, encoding traffic data in the data chirp signal via the symbol value of each chirp; and
    transmitting the data chirp signal to the receiver,
    wherein at least a portion of the address and at least a portion of the traffic data are encoded on the same chirp.

13. A method as claimed in claim 12, further comprising:
    receiving the data chirp signal from the transmitter;
    at the receiver, decoding the address associated with the communication from the sequence of gradients of symbols in the data chirp signal; and
    at the receiver, decoding traffic data in the data chirp signal from the symbol value of each chirp.

14. A method as claimed in claim 13, further comprising ceasing decoding the data chirp signal on determining that the sequence of gradients of the symbols in the chirp signal does not match the sequence of gradients of the address associated with the communication.

15. A method as claimed in claim 12, comprising further encoding the address associated with the communication via a frequency hopping sequence of the data chirp signal.

16. A method as claimed in claim 12, wherein the address associated with the communication is an address of the receiver.

17. A method as claimed in claim 16, further comprising communicating with one or more further receivers, wherein at the transmitter encoding each receiver's address via a different sequence of gradients of the symbols in the data chirp signal.

18. A method as claimed in claim 12, wherein the address associated with the communication is an address of the transmitter.

19. A method as claimed in claim 12, wherein each chirp is represented by a sequence of N samples, the N samples being cyclically shiftable such that the symbol value of the chirps is defined by the cyclic phase of the N samples.

20. A method as claimed in claim 13, further comprising synchronising the receiver to the data chirp signal using at least one symbol having a gradient of the sequence of gradients encoding the address associated with the communication.

* * * * *

UNITED STATES PATENT AND TRADEMARK OFFICE
CERTIFICATE OF CORRECTION

PATENT NO. : 8,718,117 B2
APPLICATION NO. : 13/451493
DATED : May 6, 2014
INVENTOR(S) : Hiscock It is certified that error appears in the above-identified patent and that said Letters Patent is hereby corrected as shown below:

In the Specification

In Column 1, Line 32, in Equation (1), delete "$C'(g,p)=e^{j\pi g(n-fn(p)(n+1-fn(p))/N}$" and insert -- $C(g,p) = e^{j\pi g(n-fn(p))(n+1-fn(p))/N}$ --, therefor.

In Column 3, Line 25, delete "$C'(g,p)=e^{j\lambda g(n-fn(p))(n+1-fn(p))/N}$" and insert -- $C(g,p) = e^{j\pi g(n-fn(p))(n+1-fn(p))/N}$ --, therefor.

In Column 5, Line 8, in Equation (1), delete "$C(g,p)=e^{j\pi g(n-fn(p)(n+1-fn(p))/N}$" and insert -- $C(g,p) = e^{j\pi g(n-fn(p))(n+1-fn(p))/N}$ --, therefor.

In Column 6, Lines 53-54, delete "multiplier 802" and insert -- multiplier 402 --, therefor.

In Column 6, Line 61, delete "multiplier 404" and insert -- multiplier 402 --, therefor.

In the Claims

In Column 14, Lines 6-7, in Claim 13, delete "of symbols" and insert -- of the symbols --, therefor.

In Column 14, Line 15, in Claim 15, delete "comprising further" and insert -- further comprising --, therefor.

Signed and Sealed this
Fifth Day of August, 2014

Michelle K. Lee
*Deputy Director of the United States Patent and Trademark Office*